March 2, 1965  H. J. NOLTE  3,171,519
SEAL CONSTRUCTION
Filed Sept. 6, 1960

INVENTOR:
HENRY J. NOLTE,
BY
HIS ATTORNEY.

3,171,519
SEAL CONSTRUCTION
Henry J. Nolte, Schenectady, N.Y., assignor to General Electric Company, a corporation of New York
Filed Sept. 6, 1960, Ser. No. 54,112
2 Claims. (Cl. 189—36.5)

My invention relates to seal constructions and pertains more particularly to new and improved means for joining ceramic and metal members of different coefficients of expansion.

In the electric discharge device field, for example, envelope structures are often constructed comprising a tubular ceramic member and a metal member, such as an end cap or electrode mounting member, sealed to the transverse end of the surface of the tubular member; and, usually these members are joined by one of the several ceramic-to-metal bonding techniques which are well known in the art. Additionally, in fabricating such structures it is generally desirable from the manufacturing standpoint that the seal between the ceramic and metal members be a butt seal as distinct from a lap seal which would require provision of an annular flange or a lip on the metal member to fit over and around the end of the ceramic member. However, under certain elevated temperature conditions such as are encountered in some tube processes and in certain types of tube operation, ordinary butt seals are subjected to two types of destructive forces both of which are due to differences in thermal expansion and contraction characteristics of the different materials. One such force is a shearing force tending to fracture the ceramic circumferentially adjacent the seal. The other force is a buckling or warping stress similar to that encountered in a bimetallic strip and which tends to peel the rim of the metal member from the end of the ceramic member. Heretofore, it has been the practice to cope with this problem either by utilizing metal and ceramic materials having matching thermal expansion and contraction characteristics or by forming the metal member of very thin malleable material and providing back-up ceramics in the seal constructions. However, difficulties have been encountered in obtaining ceramic and metal members of suitable matching characteristics over wide temperature ranges. Additionally, those materials found satisfactory from the thermal matching standpoint can be prohibitively expensive in the construction of larger tube envelopes. Further, the use of metal members formed of thin malleable metal has its limitations in that the resultant structure is not sufficiently sturdy for many applications. For example, in some tube structures the metal member would be required to bear heavy loads such as the weight of an electrode structure and to hold it rigidly in the device to assure uniform interelectrode spacing under vibratory conditions. Still further, the use of back-up ceramics adds to the cost and manufacturing effort.

My invention contemplates the provision of a low-cost butt seal construction which obviates the need for thermally matching joined ceramic and metal members. Additionally, it contemplates butt seal constructions adapted for assuming a high load-supporting function in the device.

Accordingly, a primary object of my invention is to provide a new and improved ceramic and metal butt seal construction.

Another object of my invention is to provide a new and improved ceramic and metal butt sealing construction which obviates the need for the ceramic and metal materials having matching thermally expansion and contraction characteristics.

Another object of my invention is to provide a new and improved ceramic and metal butt seal construction which includes a metal member adapted for assuming a substantial load-bearing function in a device incorporating the construction.

Another object of my invention is to provide a new and improved ceramic and metal butt seal construction which is relatively simple and inexpensive from the manufacturing standpoint.

Further objects and advantages of my invention will become apparent as the following description proceeds and the features of novelty which characterize my invention will be pointed out with particularity in the claims annexed to and forming part of this specification.

In carrying out the objects of by invention I provide a tubular ceramic member. Butt sealed to a transverse end surface of the ceramic member by a ceramic-to-metal bond is one transverse surface of an annular malleable metal member having a predetermined thickness and a width dimension that is generally comparable to the wall thickness of the ceramic member. Butt sealed to the opposed transverse surface of the malleable metal member by a metal-to-metal bond is a rim of a metal envelope member. The metal envelope member can be formed of any material and thickness and, thus, can be employed as a load-bearing element in the structure, such as an electrode support.

For a better understanding of my invention reference may be had to the accompanying drawings in which.

Figure 1:
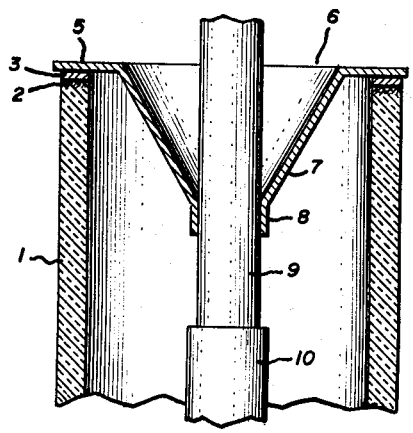
FIGURE 1 is a fragmentary sectional view of a portion of an envelope structure incorporating an embodiment of my invention.
Figure 2:
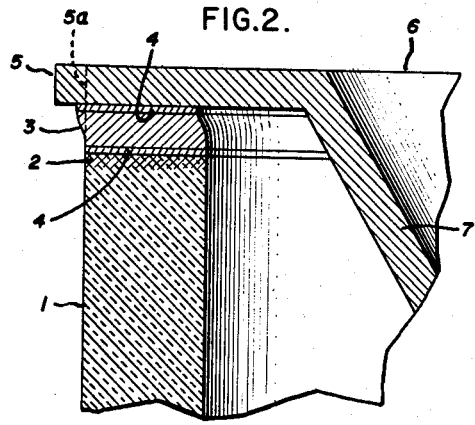
FIGURE 2 is an enlarged fragmentary sectional view illustrating an operational feature of my invention.
Figure 3:
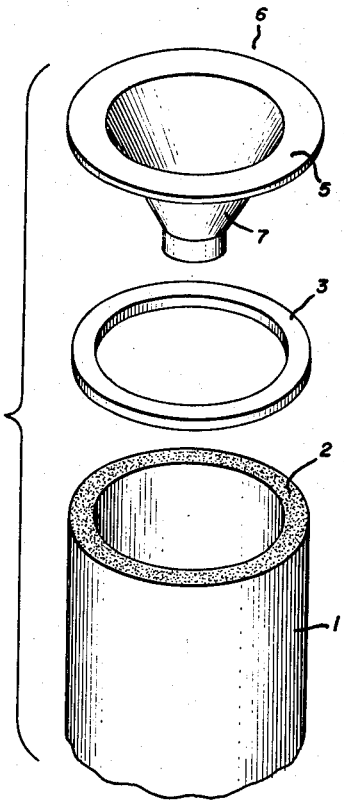
FIGURE 3 is an enlarged fragmentary exploded perspective view illustrating a manner of assembling an envelope structure constructed according to my invention.

Referring to the drawing, there is shown in FIGURE 1 a portion of an electric discharge device including an embodiment of my invention. The structure of FIGURE 1 includes a ceramic cylinder 1 which can be formed of any one of several well-known ceramic materials, such as those known as forsterite and alumina. Provided on the transverse end surface of the cylinder 1, and as perhaps better seen in FIGURES 2 and 3, is a metallized area designated 2. The metallizing provided on the area 2 can be advantageously formed, for example, by the method of metallizing disclosed in my U.S. Patent 2,667,427, Nolte issued January 6, 1954, and assigned to the same assignee as the present invention.

Bonded to the metallized area 2 of the ceramic 1 is one surface of a malleable metal annulus or washer-like member 3. The bonding of the washer 3 to the ceramic cylinder 1 can be effected by any suitable brazing material indicated at 4 in FIGURE 2. For example, the brazing material can comprise a silver-copper eutectic material shim.

Resting on the opposite surface of the member 3 and bonded thereto by another layer of eutectic brazing material 4 is a flange or rim 5 formed on a metal envelope member generally designated 6. The particular member 6 illustrated in the drawing includes a frusto-conical section 7 having a cylindrical inner rim 8 having brazed therein a rod-like electrode lead 9. The lead 9 can be provided for supporting and making electrical contact with an electrode element, such as a cathode schematically illustrated in the drawing and generally designated 10.

In the structure illustrated the washer-like member 3 preferably has a cross-sectional width corresponding generally to the wall thickness of the ceramic 1 and a cross-sectional thickness of approximately ⅔ the thickness of the flange 5 on the joined member 6. For example, the invention has been employed effectively in a structure including a ceramic cylinder having a wall thickness of approximately ¼" thickness, a member 6 having a flange 5 of approximately .030" thickness and a member 3 of approximately ¼" width and approximately .020" thickness. Additionally, the member 3 can be advantageously formed of copper to provide desired malleability. The member 6, in order to be adapted for serving satisfactorily as a load-bearing member is preferably formed of a metal which is generally stronger than copper, for example, the member 6 can be advantageously formed of nickel, iron, steel, nickel-iron, stainless steel and like materials capable of supporting heavy loads without excessive distortion.

In the structure illustrated, the ceramic material of the cylinder 1 and the material of the member 6 need not be of a compatible nature from the standpoint of thermal expansion characteristics. As illustrated somewhat exaggeratedly in FIGURE 2, the member 6 during processing and under other elevated temperature conditions tends to expand circumferentially and radially an amount greater than the ceramic cylinder 1. In prior art devices this difference in expansion will ordinarily cause fracture of the ceramic adjacent the metallizing surface or warpage of the flange 5 in a manner which would cause it to peel away from the ceramic; and, as pointed out above, it has heretofore been necessary either to match the thermal expansion characteristics of the ceramic and metal members or to make the metal member of thin construction. In my device the ceramic and metal members need not be thermally matched and the member 6 can be of sturdy thick-walled construction and avoidance of ceramic fracture and flange peeling is obtained through the interposition of the washer 3. The washer 3 is formed of a malleable or relatively soft metal compound to the material of both the ceramic cylinder 1 and member 6 and will tend to deform the or flow in the region of the member adapted for greater expansion in order to compensate for the expansion difference between the joined members. For example, and as seen in FIGURE 2, when the flange 5 of member 6 expands it ordinarily expands to a greater extent than the ceramic 1. It is, however, hermetically bonded to the upper surface of the malleable member 3 by the layer of brazing material 4. The lower surface of the member 3 is similarly bonded to the metallized surface 2 of the ceramic 1 by the lower layer of brazing material 4. Thus, when the member 5 expands radially to an extent greater than member 1, as, for example, outwardly from the dotted line edge position 5a in FIGURE 2, the upper portion of the washer 3 is deformed slightly outwardly in the manner illustrated exaggeratedly in FIGURE 2. This has a desired compensating effect for the expansion differences between the ceramic cylinder and flange 5 and occurs without adversely affecting the seals effected between the member 3 and the members 1 and 5 by means of the layers of brazing material 4. Upon cooling and contraction of the flange 5 the member 3 will reassume its straight-walled condition as shown by the dotted lines in FIGURE 2.

It will be understood from the foregoing that the washer-like member 3 has sufficient opposed surface areas for providing joints between the member 3 and the members 1 and 5 which are sufficiently strong to withstand the shearing stresses that will result even with the deformation of the malleable material of the member 3. Additionally, the member 3 is of sufficient thickness to provide sufficient material bulk to undergo the compensating deformation described above. In calculating the required thickness of a member 3 to be used in a seal constructed according to my invention, it will be necessary to determine and take into account the material and dimensions of the members 1 and 6 to be incorporated in the structure. However, these members can, with my invention, be substantially different in thermal expansion characteristics and the member 6 can be of sturdy construction rather than thin-walled and malleable.

Thus, it will be seen that I have provided a seal construction wherein matching of the thermal expansion and contraction characteristics of the members 1 and 6 need not be provided in order to insure a satisfactory seal therebetween. Additionally, my invention enables the employment of material for forming the member 6 without regard to its thermal expansion and contraction characteristics which enables me to employ material which will be suitable for bearing a substantial load, such as an electrode element 10 mounted on a support lead 9 brazed to an inner flange 8 on the member 6. Further, in my structure avoidance of peeling of the flange 5 from the ceramic is accomplished without reliance on a seal back-up member.

It will be further understood from the foregoing that while I have shown my invention as applied in the construction of an end portion of an envelope and wherein the member 6 comprises, in effect, a well-defining element, my invention is not limited to such structures. For example, the seal construction of my invention could be employed satisfactorily for sealing in an envelope structure an electrode support member, or the like, having a flange such as the flange 5 extending between and brazed to opposed transverse end surfaces of ceramic elements. In such a structure the seal arrangement of FIGURE 2 would be repeated on the opposite surface of the member 5 and would be provided for effecting a seal to another ceramic which, if desired, can be identical to the ceramic 1.

It will be understood still further that my invention is not limited to structures including cylindrical ceramic members but is equally applicable to structures including various tubular ceramic configurations. For example, the ceramic 1 could comprise a relatively flat washer-like element. Additionally, and by way of example also, the joined metal member could comprise a disk-like element.

While I have shown and described a specific embodiment of my invention I do not desire my invention to be limited to that particular form shown and described, and I intend by the appended claims to cover all modifications within the spirit and scope of my invention.

What I claim as new and desire to secure by Letters Patent of the United States is:

1. An envelope seal construction comprising an annular ceramic member having a wall portion of predetermined thickness, a metal member including a rim portion of predetermined thickness and overlying the transverse end surface of said ceramic member, a flat annulus of malleable metal having a pair of opposed sealing surfaces and wholly interposed between said rim portion and said transverse end surface of said ceramic member, said annulus having a cross sectional width substantially equal to the thickness of the wall portion of said ceramic member and a cross sectional thickness approximately ⅔ the thickness of said rim portion, a ceramic-to-metal bond between one surface of said malleable metal annulus and said ceramic member and a metal-to-metal bond between the other surface of said malleable metal annulus and said rim portion of said metal member, said annulus having a predetermined malleability characteristic and dimensional relation to said ceramic member and said rim portion to deform sufficiently as a result of any thermal expansion differences between said ceramic and metal members to avoid damage to said ceramic member and bonds.

2. In an electrical discharge device an envelope structure comprising a ceramic cylinder including a wall portion of predetermined thickness terminating in a transverse end surface, a metal electrode support member including a circular flange of predetermined thickness and overlying the transverse end surface of said cylinder and supporting an electrode element, a discrete flat copper washer-like member having a cross sectional width substantially equal to the wall thickness of said ceramic member and a cross sectional thickness approximately equal to ⅔ the flange thickness, said copper member being interposed wholly between said transverse end surface and said flange and hermetically bonded therebetween, the relative dimensions of said copper member and said ceramic wall and said flange being effective to provide deformation of said copper member in response to thermal effects, said deformation being effective to minimize rupture of said ceramic cylinder, said electrode support member being constituted of a metal having substantially greater strength than copper.

References Cited by the Examiner

UNITED STATES PATENTS

| 2,667,432 | 1/54 | Nolte | 29—473.1 X |
| 2,720,997 | 10/55 | Dailey et al. | 220—2.3 |
| 2,915,153 | 12/59 | Hitchcock | 189—36.5 |

JACOB L. NACKENOFF, *Primary Examiner.*

R. A. HILL, JOEL REZNEK, *Examiners.*